United States Patent [19]
Wilfert

[11] 3,951,427
[45] Apr. 20, 1976

[54] SHOCK-ABSORBING FRONT-WALL FOR MOTOR VEHICLES

[75] Inventor: Karl Wilfert, Gerlingen-Waldstadt, Germany

[73] Assignee: Daimler-Benz Aktiengesellschaft, Germany

[22] Filed: Apr. 4, 1974

[21] Appl. No.: 458,041

Related U.S. Application Data

[62] Division of Ser. No. 208,315, Dec. 15, 1971, Pat. No. 3,817,553.

[30] Foreign Application Priority Data
Dec. 15, 1970 Germany............................ 2061595
Dec. 23, 1970 Germany............................ 2063478

[52] U.S. Cl................................ 280/732; 180/90; 280/752
[51] Int. Cl.²......................................... B60R 21/08
[58] Field of Search................ 280/150 AB, 150 B; 180/90

[56] References Cited
UNITED STATES PATENTS

| 2,827,305 | 3/1958 | Graham | 280/150 B |
| 2,833,554 | 5/1958 | Ricordi | 280/150 B |
| 3,450,414 | 6/1969 | Kobori | 280/150 AB |
| 3,618,974 | 11/1971 | Chute | 280/150 AB |
| 3,618,978 | 11/1971 | Klove | 280/150 AB |
| 3,632,132 | 1/1972 | Richardson | 280/150 AB |
| 3,632,136 | 1/1972 | Foltz | 280/150 AB |
| 3,642,303 | 2/1972 | Irish | 280/150 AB |
| 3,702,711 | 11/1972 | Beckley | 280/150 B X |
| 3,708,179 | 1/1973 | Hulten | 280/150 AB |

Primary Examiner—M. H. Wood, Jr.
Assistant Examiner—John P. Silverstrim
Attorney, Agent, or Firm—Craig & Antonelli

[57] ABSTRACT

A shock-absorbing front wall for motor vehicles, especially passenger motor vehicles which includes several sections, arranged one above the other, of padded parts projecting into the vehicle interior and permanently deformable by the impact of a vehicle passenger caused by an accident; these sections which are arranged one above the other thereby possess different rigidities and/or thicknesses of the padding layer matched to the impinging body portions; an inflatable gas cushion may also form part of a respective section.

20 Claims, 5 Drawing Figures

SHOCK-ABSORBING FRONT-WALL FOR MOTOR VEHICLES

This is a division, of application Ser. No. 208,315 filed Dec. 15, 1971, now U.S. Pat. No. 3,817,553.

The present invention relates to a shock-absorbing front wall for motor vehicles, especially passenger motor vehicles, which includes padded parts projecting into the vehicle interior and permanently deformable by an impact of a vehicle passenger caused by an accident.

Shock-absorbing steering wheel constructions are known in the art which are injury-reducing in their effect and which in case of impact accidents against non-yielding obstacles offer to the driver a chance of survival coupled with relatively minor injuries up to predetermined maximum velocities. Exhaustive tests in the field of biomechanics and comparative tests have clearly established the same. However, for the co-driver, i.e., the passenger seated alongside the driver, this chance of survival does not exist under the same driving conditions. These results were also determined experimentally as well as by autopsies.

In case of a frontal impact, the body is thrown against the front wall (instrument panel) and the magnitude of the impact forces on the individual body parts of the person in question is differently large depending on the deformation possibility of the construction at the impact place. A survival chance exists only if the impact forces are so matched to one another in a vertical plane that the permissive tolerance limit is not exceeded at any part of the body which might result otherwise in fatal injuries.

Consequently, a shock-absorbing front wall for motor vehicles, especially passenger motor vehicles is proposed, which is provided with padded parts projecting into the vehicle interior and permanently deformable in case of an impact of a vehicle passenger caused by an accident, which according to the present invention includes sections arranged one above the other with differentiated rigidity and/or thickness of the padding layer matched to the impinging body parts.

An optimum differentiation is possible when the individual sections are constituted by different structural elements that are secured at the vehicle independently of one another.

According to a preferred embodiment of the present invention, the individual sections are constituted by deformation members consisting of sheet metal elements which are covered with a padding of varying thickness.

The best possible adaptation to an impinging body is achieved when separate sections are provided for the protection of the head and thorax, on the one hand, and of the legs, on the other.

For the adaptation to the different body parts of differing resistance capabilities which impinge on a deformation member, such a deformation member may be made advantageously of sheet metal parts of different thicknesses.

For the far-reaching dissipation of the impact energy, it may be furthermore of advantage if the connection at the vehicle of the deformation members forming the individual sections takes place by way of deformable elements which absorb energy in the impact direction.

Under certain circumstances, the deformation members may also be made of a plastically deformable synthetic material, such as a deformable synthetic resinous material of known type in lieu of sheet metal.

Moreover, it may be of advantage if separate deformable front wall parts are provided for the driver and the passengers seated alongside the driver.

To further improve the protection afforded by such a shock-absorbing front wall for vehicles, especially for passenger motor vehicles of the type described hereinabove, in order to assure maximum protection for the impinging vehicle passengers in case of an accident, an inflatable gas cushion adapted to be automatically inflated in case of an accident is additionally provided according to the present invention at least at the section of the front wall absorbing the impact of the head and thorax of a vehicle passenger.

With such an arrangement, the kinetic energy is transmitted from body parts impinging on the gas cushion by way of the gas cushion to the front wall and is absorbed by deformation thereof.

According to a particularly advantageous construction of the present invention, the gas cushion—in the inflated condition as viewed in a cross section in the vehicle longitudinal plane—is constructed approximately semicircularly shaped in its lower area and approximately conically shaped in its upper area.

It may be furthermore of advantage with a front wall constructed in accordance with the present invention if a gas cushion is also arranged at the section of the front absorbing the impact of the legs of a vehicle passenger.

Preferably, the folded gas cushions in their normal position are so embedded in the padding of the front wall that the surface of these parts are disposed approximately in a common plane.

Finally, according to a further preferred embodiment of the present invention, the surfaces of the gas cushions facing the vehicle passengers may be provided with an elastic protective layer such as, for example, with a padding of foamed material of any known type.

Accordingly, it is an object of the present invention to provide a shock-absorbing front wall for vehicles, especially passenger motor vehicles, which avoids by simple means the aforementioned shortcomings and drawbacks.

Another object of the present invention resides in a front wall construction for vehicles, especially passenger motor vehicles which also offers a chance of survival to the passenger or passengers seated alongside the driver.

A further object of the present invention resides in a shock-absorbing front wall for motor vehicles by means of which fatal injuries are effectively avoided by a proper adaptation of the various sections of the front wall to the tolerance limits permitted for the respective body parts.

Still a further object of the present invention resides in a passenger motor vehicle in which an optimum differentiation of the various sections thereof is made possible.

A further object of the present invention resides in a shock-absorbing front wall for vehicle passengers which utilizes gas cushions for transmitting the forces of the impinging body parts to the front wall sections where these forces are then absorbed by deformation.

These and other objects, features, and advantages of the present invention will become more apparent from the following description when taken in connection with the accompanying drawing, which shows, for purposes of illustration only, two embodiments in accordance with the present invention, and wherein.

Figure 1:
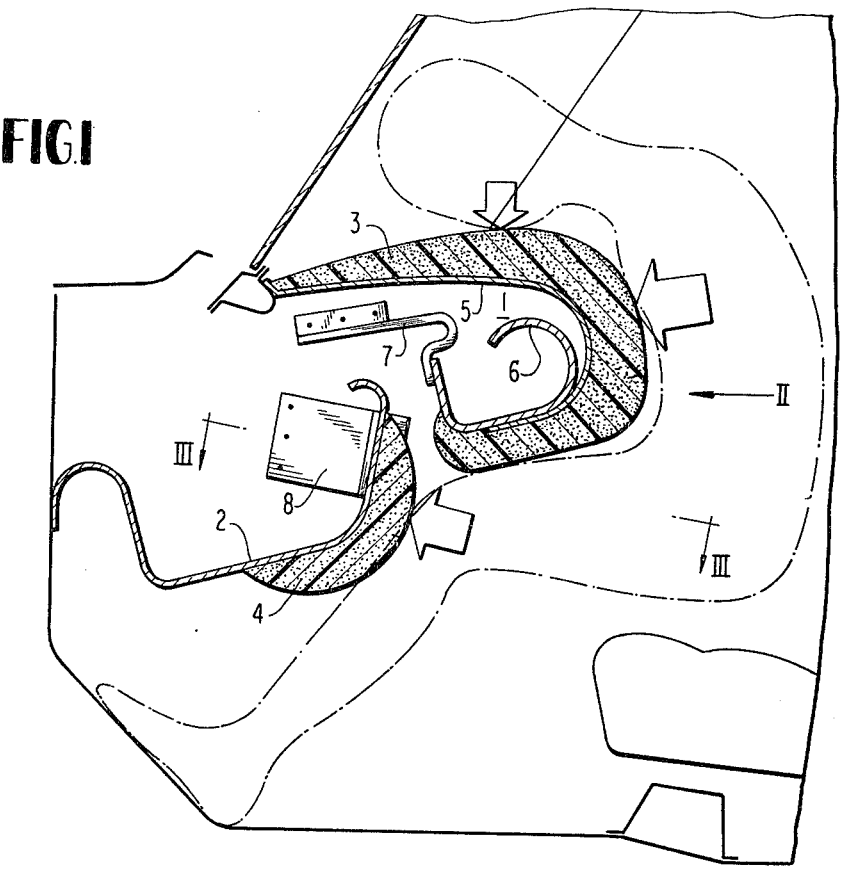
FIG. 1 is a somewhat schematic longitudinal cross-sectional view through a front wall construction of a passenger motor vehicle in accordance with the present invention.
Figure 2:
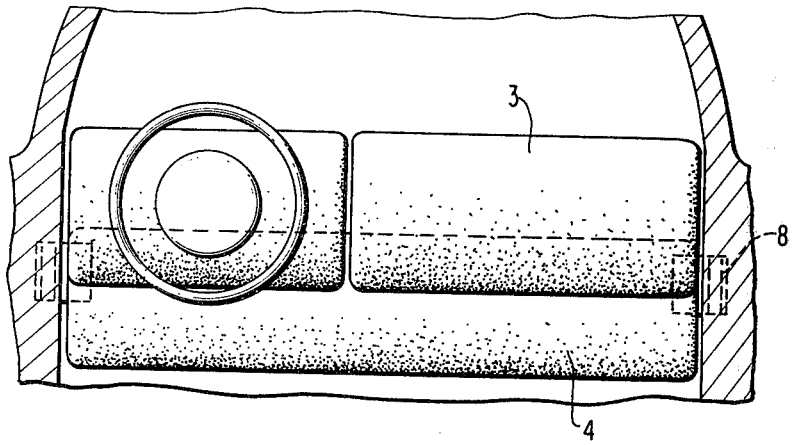
FIG. 2 is an elevational view taken in the direction of arrow II in FIG. 1.

Referring now to the drawing wherein like reference numerals are used throughout the various views to designate like parts, and more particularly to FIG. 1, the directions of the main impact forces of the different body parts of a vehicle passenger indicated in dash and dot lines in case of an impact accident against a fixed obstacle are indicated by the large arrows.

The head and thorax of the vehicle passenger thereby impinge on a first section of a shock-absorbing front wall constituted by a deformation member 1 consisting of sheet metal whereas the legs come into contact with a second section constituted by a deformation member 2. Both deformation members 1 and 2 are covered with a padding 3 and 4 consisting preferably of a foamed material, such as a conventional synthetic resinous foam material, whose varying thickness is to be matched to the resistance of the respective impinging body parts. The same is true also for the rigidity and strength of the different areas of the deformation members 1 and 2 which can be varied by corresponding shaping and selection of the wall thicknesses. Thus, the deformation member 1 consists of two sheet metal members 5 and 6 of different thickness in order to achieve differing rigidities in its different areas.

Figure 3:
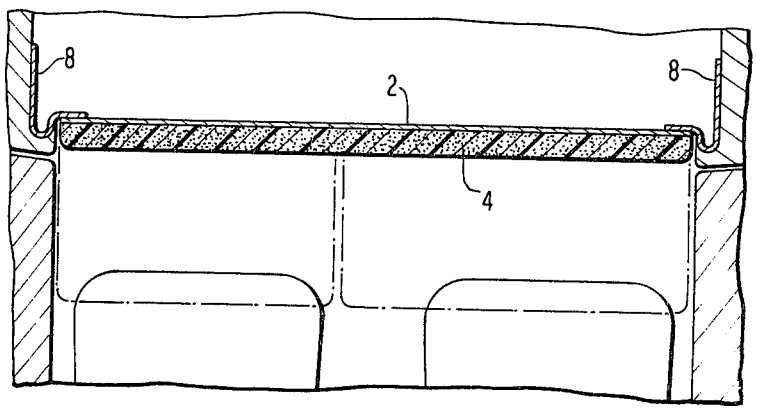
FIG. 3 is a cross-sectional view taken along line III—III of FIG 1.

The connection of the sides of the deformation members 1 and 2, facing the interior space, at the vehicle takes place by way of deformable elements 7 and 8 (FIG. 3) which are also of the energy absorbing type.

Figure 4:
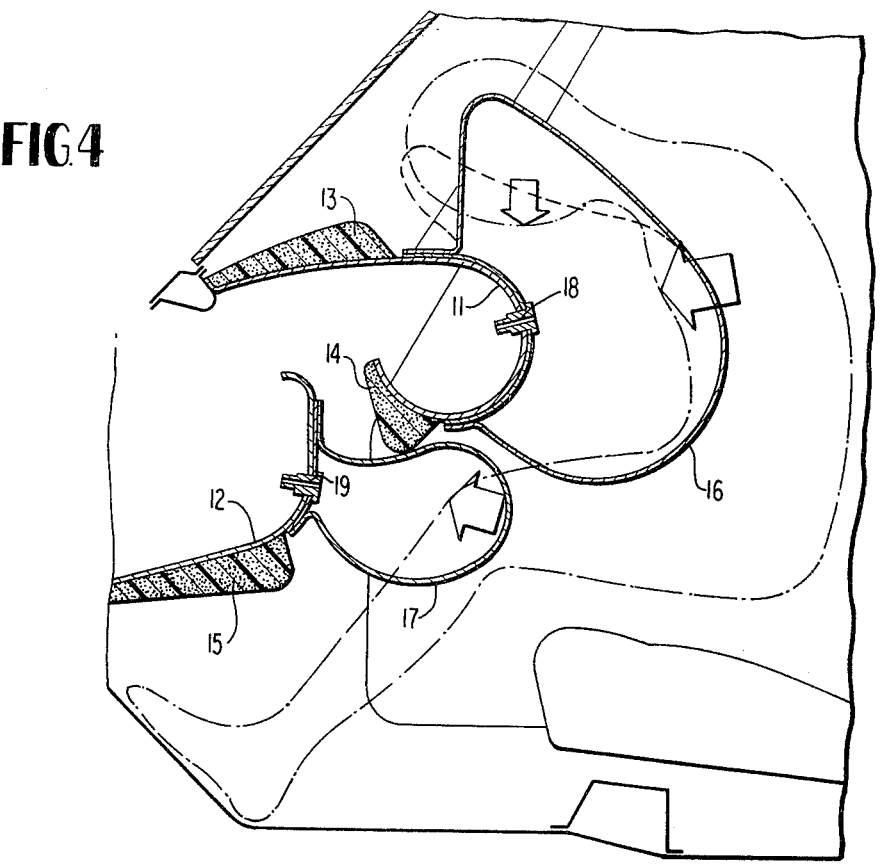
FIG. 4 is a somewhat schematic longitudinal cross-sectional view through a modified embodiment of a front wall construction of a passenger motor vehicle in accordance with the present invention, provided with a gas cushion shown in the inflated condition.

In the embodiment of FIG. 4, the directions of the main impact forces of the different body parts of a vehicle passenger indicated in dash and dot lines during an impact accident against a fixed obstacle are again indicated by the large arrows.

One gas cushion 16 and 17 is thereby arranged at the respective one of the two sections 11 and 12 of the front wall construction shown in this figure which are again provided with padded portions 13, 14 and 15. The gas cushions 16 and 17 are in communication by way of connecting elements 18 and 19, respectively, with a gas source (not shown) of conventional construction.

The gas cushion 16 is thereby so constructed—as can be clearly seen from FIG. 4—that it has an approximately semi-circular shape in its lower area and terminates approximately conically in its upper area. As a result of the upward conical extension of the gas cushion 16, the latter is pressed forwardly during the impact of a head corresponding to the dash line illustrated in FIG. 1 and thus an overload of the neck vertebrae of the impinging vehicle passenger is avoided.

Figure 5:
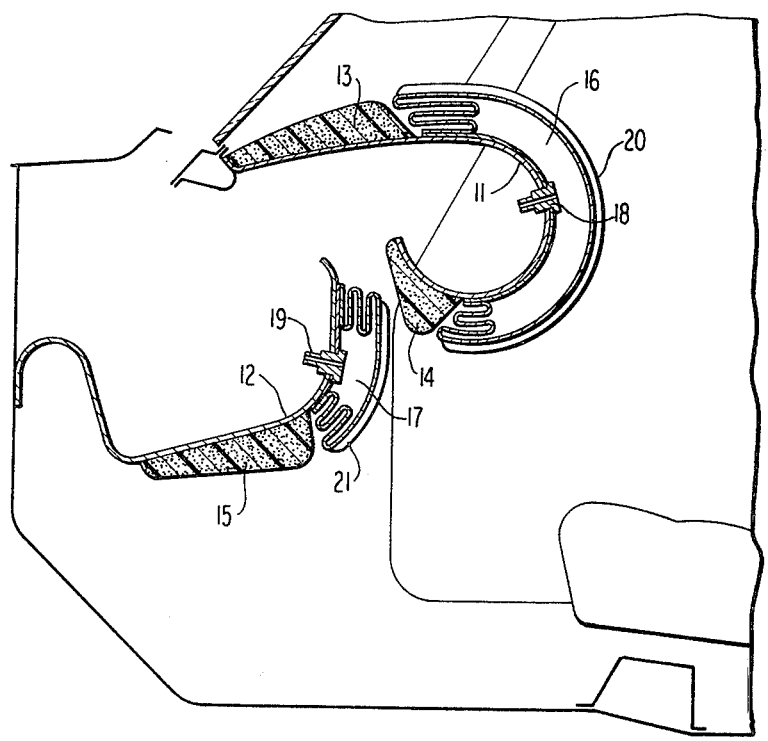
FIG. 5 is a cross-sectional view, similar to FIG. 4, in which the gas cushions are illustrated in their normal folded-together position.

As can be seen from FIG. 5, the gas cushions 16 and 17 are provided at their surface facing the vehicle passengers each with an elastic protective layer 20 and 21, by means of which damaging of the gas cushions 16 and 17 during the operation of the vehicle is prevented.

The filling of the gas cushions 16 and 17 in case of a collision accident can take place in a conventional manner in dependence on a switch responding to the vehicle deceleration by way of a gas source (not shown). The size configuration, and inflating pressure of the gas cushions have to be matched thereby to the pressure tolerance limit and the movement direction of the impinging body parts.

While I have shown and described only two embodiments in accordance with the present invention, it is understood that the invention is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A shock-absorbing front wall for motor vehicles, especially passenger motor vehicles, the shock-absorbing front wall includes shock-absorbing means that are permanently deformable as a result of an impact of a vehicle passenger caused by an accident, said shock absorbing means comprising: a first shock-absorbing and a second shock-absorbing section, means for independently mounting said first and said second shock-absorbing sections on the front wall of the motor vehicle one above the other in a spaced relationship, said first shock-absorbing section including a first deformation member projecting into the vehicle interior for absorbing the impact energy of at least one impinging body portion of a vehicle passenger, padding means disposed over at least a portion of the outer surface of said first deformation member, said second shock-absorbing section including a second deformation member projecting into the vehicle interior and disposed on the front wall of the vehicle below said first deformation member for absorbing impact energy of at least one other impinging body portion of a vehicle passenger, padding means provided over at least a portion of the outer surface of said second deformation member, said first and said second deformation member each having a different rigidity with the shock-absorbing characteristics of the respective deformation members being matched to the respective body portions impinging thereon, and an inflatable gas cushion means adapted to be automatically inflated in case of an accident mounted on at least one section of said shock-absorbing means.

2. A front wall according to claim 1, wherein said first and second deformation members consist of sheet metal, and wherein said padding means provided on said first and second deformation members is of varying thickness, the thickness of the padding means on the respective deformation members being matched to the respective body portions impinging thereon.

3. A front wall according to claim 2, wherein said first section is provided for the protection of the head and thorax of the vehicle passenger, and said second section is provided for the protection of the legs of the vehicle passenger.

4. A front wall according to claim 1, wherein said first section is provided for the protection of the head and thorax of the vehicle passenger, and said second section is provided for the protection of the legs of the vehicle passenger.

5. A front wall according to claim 1, wherein said inflatable gas cushion means is mounted on said first shock-absorbing section of said shock-absorbing means for absorbing the impact of the head and thorax of a vehicle passenger.

6. A front wall according to claim 5, wherein said gas cushion means in an inflated condition includes a lower portion extending from said first shock-absorbing section above the thighs of a vehicle passenger to an area of the neck of the passenger, an upper portion disposed in an area of the head of the vehicle passenger, and an intermediate portion defining a transitional area from said power portion to said upper portion, said upper and lower portions of said gas cushion means as viewed in a cross section in a vehicle longitudinal plane being constructed approximately semi-circularly shaped in said lower portion and approximately conically shaped in said upper portion.

7. A front wall according to claim 5, wherein a further gas cushion means is provided, said further gas cushion means being mounted on said second shock-absorbing section for absorbing the impact of the legs of a vehicle passenger.

8. A front wall according to claim 7, wherein said padding means on said first and said second deformation members each include an outer surface portion, said gas cushion means and said further gas cushion means in the normal position thereof each including an outer surface portion facing the vehicle passenger, the respective outer surface portions of the respective gas cushion means being disposed approximately in a common plane with the respective outer surface portions of the padding means provided on the respective deformation members.

9. A front wall according to claim 8, wherein said outer surface portions of said gas cushion means and said further gas cushion means are each provided with an elastic protective layer.

10. A front wall according to claim 9, wherein said elastic protective layer consists of a foam material padding.

11. A front wall according to claim 10, wherein said gas cushion means in an inflated condition includes a lower portion extending from said first shock-absorbing section above the thighs of a vehicle passenger to an area of the neck of the passenger, an upper portion disposed in an area of the head of the vehicle passenger, and an intermediate portion defining a transitional area from said lower portion to said upper portion, said upper and lower portions of said gas cushion means as viewed in a cross section in a vehicle longitudinal plane being constructed approximately semi-circularly shaped in said lower portion and approximately conically shaped in said upper portion.

12. A front wall according to claim 5, wherein said padding means on said first deformation member includes an outer surface portion, and wherein said gas cushion means on said first shock-absorbing section in the normal position thereof includes an outer surface portion disposed approximately in a common plane with the outer surface portion of said padding means.

13. A front wall according to claim 5, wherein said outer surface portions of said gas cushion means and said further gas cushion means are each provided with an elastic protective layer.

14. A front wall according to claim 13, wherein said elastic protective layer consists of a foam material padding.

15. A front wall according to claim 1, wherein said deformation members consist of a plastically deformable synthetic material.

16. A front wall according to claim 1, wherein said first deformation member includes a first portion connected to the front wall of the vehicle and extending outwardly therefrom in the direction of a vehicle passenger, a second arcuate portion facing the vehicle passenger and disposed in the area of the thorax of the passenger, and wherein said padding means on said first deformation member is disposed on said first portion of said deformation member and said gas cushion means is mounted on said second arcuate portion of said deformation member.

17. A front wall according to claim 16, wherein said second arcuate portion terminates in a free end, a further padding means is provided on said first deformation member at the free end thereof, said gas cushion means in a normal position extending between said first mentioned padding means on said first deformation member and said further padding means.

18. A front wall according to claim 17, wherein a further gas cushion means is provided, said further gas cushion means being mounted on said second shock-absorbing section for absorbing the impact of the legs of a vehicle passenger.

19. A front wall according to claim 18, wherein said further padding means on said first deformation member projects downwardly from the free end of said first deformation member and contacts said further gas cushion means in an inflated condition thereof.

20. A front wall according to claim 19, wherein said second deformation member includes a first portion connected to the front wall of the vehicle and extending outwardly therefrom, a second portion extending at an angle from said first portion of said second deformation member toward said first portion of said first deformation member, said further gas cushion means being mounted on said second portion of said second deformation member, said padding means on said second deformation member being provided on said first portion of said second deformation member.

* * * * *